United States Patent
Lopez-Garcia

(10) Patent No.: US 9,851,588 B2
(45) Date of Patent: Dec. 26, 2017

(54) EYEWEAR WITH A PAIR OF LIGHT EMITTING DIODE MATRICES

(76) Inventor: Luis Emilio Lopez-Garcia, Isabela, PR (US)

( * ) Notice: Subject to any disclaimer, the term of this patent is extended or adjusted under 35 U.S.C. 154(b) by 0 days.

(21) Appl. No.: 13/461,775

(22) Filed: May 1, 2012

(65) Prior Publication Data

US 2013/0293830 A1 Nov. 7, 2013

(51) Int. Cl.
*G02C 11/00* (2006.01)
*G02C 11/04* (2006.01)

(52) U.S. Cl.
CPC .............. *G02C 11/10* (2013.01); *G02C 11/04* (2013.01)

(58) Field of Classification Search
CPC ................................ G02C 11/00; G02C 11/04
USPC ............ 351/41–178; 362/35, 103, 105, 253; 446/27, 175; 40/442, 444, 541–583, 586; 2/13, 15, 432, 433, 440, 442
See application file for complete search history.

(56) References Cited

U.S. PATENT DOCUMENTS

| | | | | | |
|---|---|---|---|---|---|
| 1,660,587 | A | * | 2/1928 | Tully | 2/441 |
| 3,463,885 | A | * | 8/1969 | Upton | 704/276 |
| 4,254,451 | A | * | 3/1981 | Cochran, Jr. | A44C 15/0015 315/323 |
| 4,283,127 | A | * | 8/1981 | Rosenwinkel | G02C 11/04 2/426 |
| 4,300,818 | A | * | 11/1981 | Schachar | A61B 3/103 349/13 |
| 6,629,076 | B1 | * | 9/2003 | Haken | G10L 21/06 704/270 |
| 7,052,167 | B2 | * | 5/2006 | Vanderschuit | A61F 7/02 362/231 |
| 8,188,880 | B1 | * | 5/2012 | Chi | G02B 27/017 340/815.45 |

(Continued)

FOREIGN PATENT DOCUMENTS

| | | | | | |
|---|---|---|---|---|---|
| DE | 202011050692 | U1 | * | 11/2011 | |
| JP | 2012185461 | A | * | 9/2012 | G09B 21/00 |
| KR | 20090027715 | A | * | 3/2009 | G02C 11/04 |

OTHER PUBLICATIONS

NPL Funky Rave Glasses doc copied from the internet at http://www.instructables.com/id/FUNKY-RAVE-GLASSES-LED-MATRIX-GLASSES-USING-A-PIC/ dated Apr. 10, 2011.*

(Continued)

*Primary Examiner* — Ricky Mack
*Assistant Examiner* — Gary O'Neill
(74) *Attorney, Agent, or Firm* — Michele V. Frank; Venable LLP

(57) ABSTRACT

An eyewear with a pair of light emitting diodes (LED) matrices is an apparatus that enhances the aesthetic appeal of the eyewear by illuminating different patterns and letterings with the pair of LED matrices. A left lens and a right lens each have an LED matrix, which traverse through and protrude out of their respective lens. Both LED matrices are electronically connected to a programmable microcontroller, which is able to turn on/off each individual LED in order to create the patterns and letterings on the LED matrices. The microphone and VU meter also allows the LED matrices to display patterns and lettering that relate to the music or sounds around the apparatus. Each individual LED for both LED matrices are properly spaced apart from each other so that visibility is not significantly reduced while wearing the apparatus.

20 Claims, 5 Drawing Sheets

(56) References Cited

U.S. PATENT DOCUMENTS

| | | | | |
|---|---|---|---|---|
| 2002/0140899 A1* | 10/2002 | Blum et al. | | 351/159 |
| 2004/0183749 A1* | 9/2004 | Vertegaal | | G06F 3/011 |
| | | | | 345/7 |
| 2007/0189003 A1* | 8/2007 | Daley | | A41G 7/02 |
| | | | | 362/105 |
| 2008/0316605 A1* | 12/2008 | Hazell | | G02B 6/0033 |
| | | | | 359/630 |
| 2009/0174348 A1* | 7/2009 | Cugini | | H05B 33/0827 |
| | | | | 315/312 |
| 2010/0182564 A1* | 7/2010 | Smith | | A61H 5/00 |
| | | | | 351/203 |
| 2011/0037606 A1* | 2/2011 | Boise | | G02C 11/04 |
| | | | | 340/815.45 |
| 2011/0102734 A1* | 5/2011 | Howell et al. | | 351/158 |
| 2012/0029367 A1* | 2/2012 | Hobeika | | A61B 5/02416 |
| | | | | 600/500 |

OTHER PUBLICATIONS

YouTube video titled "LED glasses" as uploaded on Aug. 25, 2011 by Pong2me (https://youtu.be/7bEf8hR-Ehl).*
PDF file of YouTube video titled "LED glasses" as uploaded on Aug. 25, 2011 by Pong2me (https://youtu.be/7bEf8hR-Ehl).*
htttps://www.youtube.com/watch?v=69aoLjXfhdQ.
http://www.instructables.com/id/FUNKY-RAVE-GLASSES-LED-MATRIX-GLASSES-USING-A-PIC/(Printed copy is attached).
Luis Lopez-Garcia, Funky Glasses Demo 1, May 2, 2011, youtube.com, USA https://www.youtube.com/watch?v=69aoLJXfhdQ.
http://www.instructables.com/id/FUNKY-RAVE-GLASSES-LED-MATRIX-GLASSES-USING-A-PIC/(Printed copy is attached).
Luis Lopez-Garcia, FUNKY RAVE GLASSES (LED MATRIX GLASSES USING A PICAXE), May 1, 2011, instructables.com, USA.

* cited by examiner

EYEWEAR WITH A PAIR OF LIGHT EMITTING DIODE MATRICES

FIELD OF THE INVENTION

The present invention relates generally to an eyewear with an aesthetic display of light emitting diodes on each lens. More specifically, the present invention can be used to illuminate different patterns and letterings with the light emitting diodes on each lens.

BACKGROUND OF THE INVENTION

Traditionally, sunglasses had been used as a fashion accessory in order enhance a user's appearance in addition to protecting the user's eyes from high-energy visible light. Sunglasses limits the user's visibility with each lens in order to prevent damage to the user's eyes. Consequently, any other decorations or other add-ons that could be attached to the lenses of the sunglasses for aesthetic appeal would only further limit the user's visibility. Therefore, the objective of the present invention is to provide eyewear with an aesthetic display of a light emitting diode matrix on each lens. The objective of the present is to also provide the eyewear with the ability to illuminate different patterns and letterings with the light emitting diode matrices in order to further enhance the aesthetic appeal of the sunglasses.

DETAILED DESCRIPTIONS OF THE INVENTION

All illustrations of the drawings are for the purpose of describing selected versions of the present invention and are not intended to limit the scope of the present invention.

Figure 1:
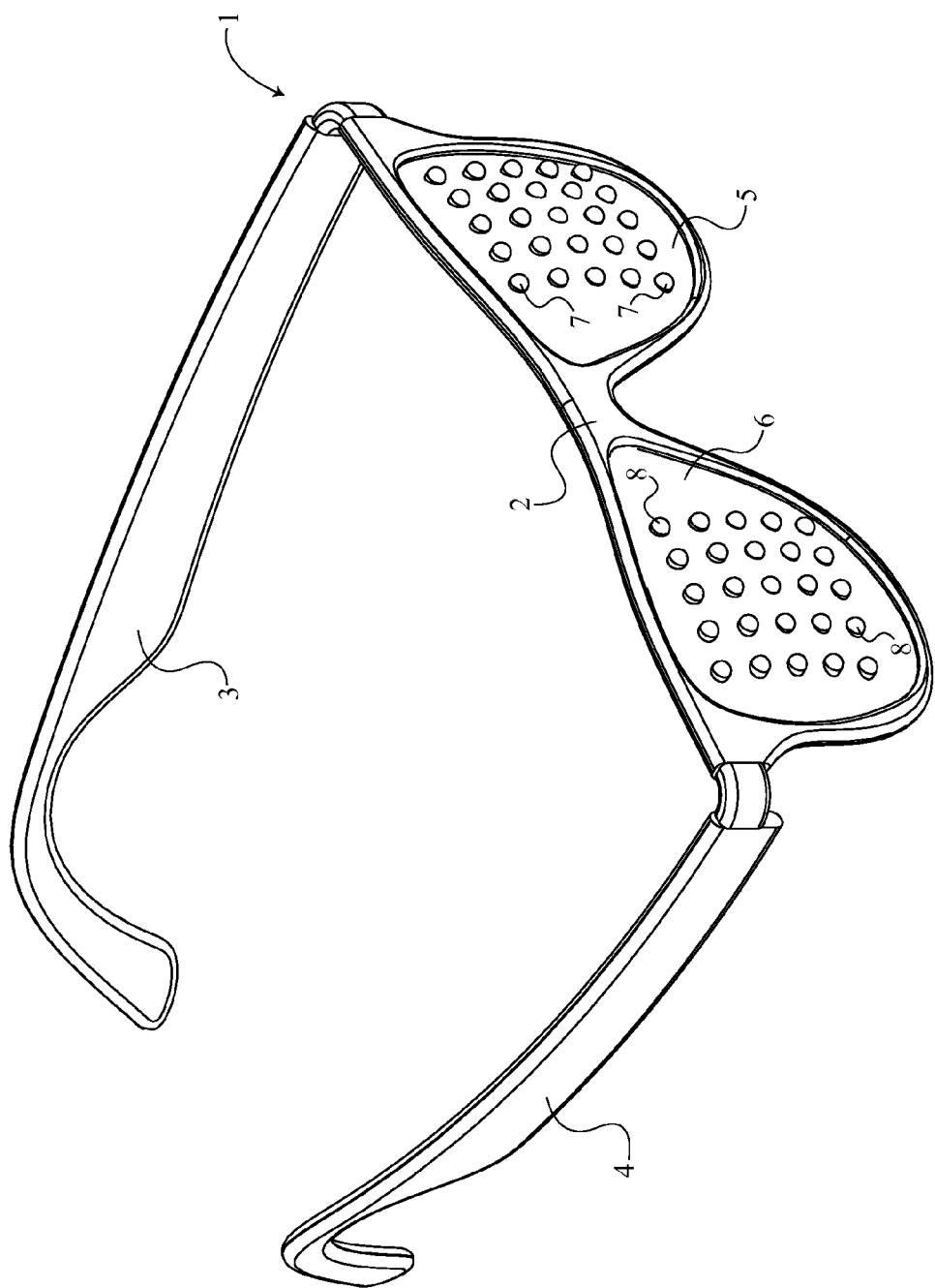
FIG. 1 is a front perspective view of the present invention.
Figure 2:
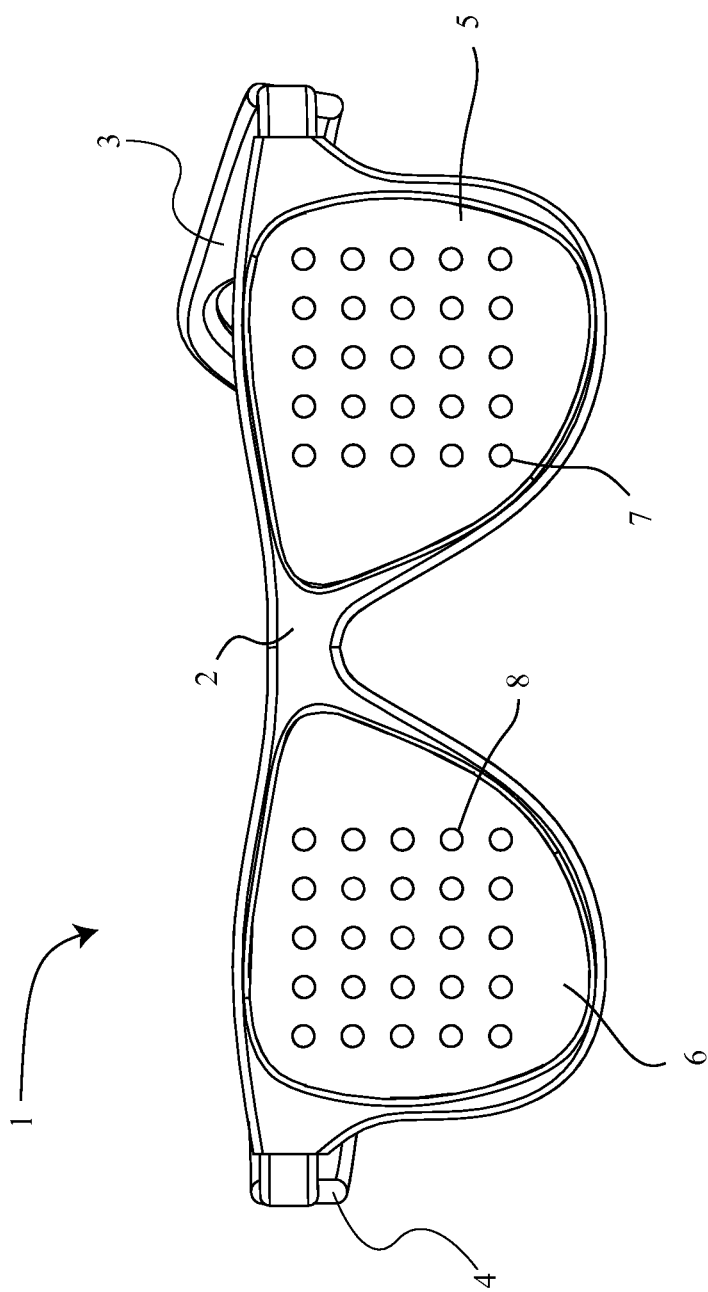
FIG. 2 is a front view of the present invention.
Figure 3:
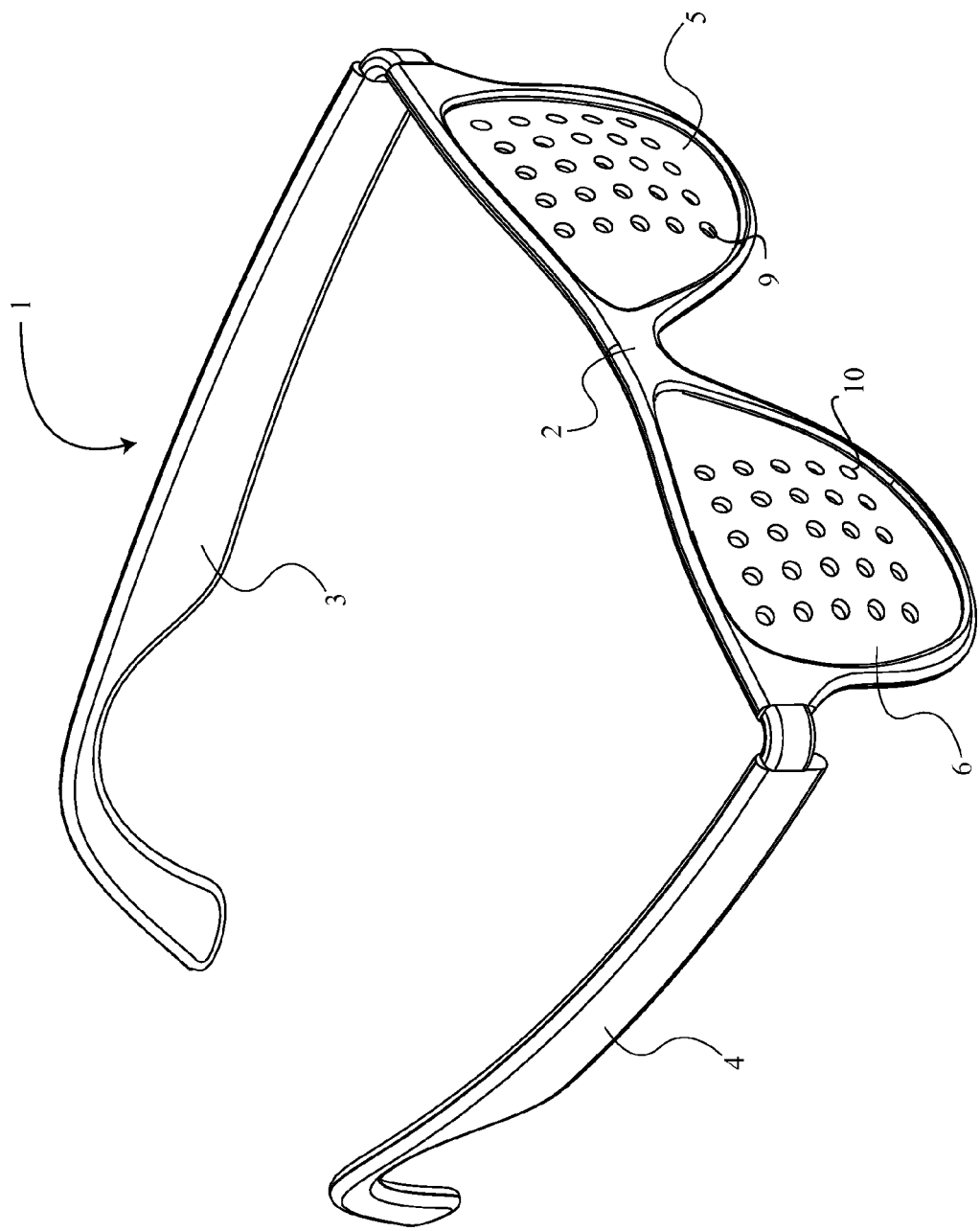
FIG. 3 is a front perspective view of the present invention without the electronic components.

As can be seen in FIGS. 1 and 2, the present invention is an eyewear with a pair of light emitting diode (LED) matrices, which are used to enhance the aesthetic display of the eyewear. The present invention is designed to be wore by a user at dark social events such as at a rave party or used at a dark night club. The present invention can be used to light up and display different patterns and letterings on the eyewear. The present invention mainly comprises an eyewear body 1, a left lens 5, a right lens 6, a left LED matrix 7, a right LED matrix 8, a plurality of left matrix holes 9, a plurality of right matrix holes 10, a programmable microcontroller 11, an integrated circuit (IC) pin socket, a micro slide switch 12, and a portable power source 14. In reference to FIG. 3, the eyewear body 1 is used to hold the present invention against the user's face. For example, the eyewear body 1 is the structure that is used to hold prescription glasses or sunglasses against a user's face. The eyewear body 1 comprises a lens frame 2, a left temple 3, and a right temple 4. The lens frame 2 is used to support the left lens 5 and the right lens 6 and braces the present invention against the bridge of the user's nose. The left temple 3 is hinged adjacent to the left side of the lens frame 2 and is used to brace the present invention against the user's left ear. The right temple 4 is hinged adjacent to the right side of the lens frame 2 and is positioned opposite of the left temple 3. The right temple 4 is used to brace the present invention against the user's right ear. In order for the user to wear the present invention, the left temple 3 and the right temple 4 need to be perpendicularly positioned to the lens frame 2.

The left lens 5 and the right lens 6 are typically used to protect the user's eyes from high-energy visible light. For example, the present invention could be used to protect the user's eyes from laser light shows or intense projected images, which are displayed at rave parties. The left lens 5 and the right lens 6 are positioned within and attached to the lens frame 2. The plurality of left matrix holes 9 traverses through the left lens 5 and are designed to receive the left LED matrix 7. The left LED matrix 7 is positioned within the plurality of left matrix holes 9 and is adhered or connected in some way to the left lens 5. Similarly, the plurality of right matrix holes 10 traverses through the right lens 6 and are designed to receive the right LED matrix 8. The right LED matrix 8 is positioned within the plurality of right matrix holes 10 and is adhered or connected in some way to the right lens 6. Each individual LED for the left LED matrix 7 and for the right LED matrix 8 should respectively protrude through the left lens 5 and the right lens 6 so that the light from each individual LED is partially blocked by the left lens 5 and the right lens 6 from the user's eyes and can be clearly seen by other people around the user. In addition, the plurality of left matrix holes 9 should be properly spaced apart from each other so that the user can see through the left LED matrix 7 on the left lens 5 Likewise, the plurality of right matrix holes 10 should be properly spaced apart from each other so that the user can see through the right LED matrix 8 on the right lens 6.

Figure 5:
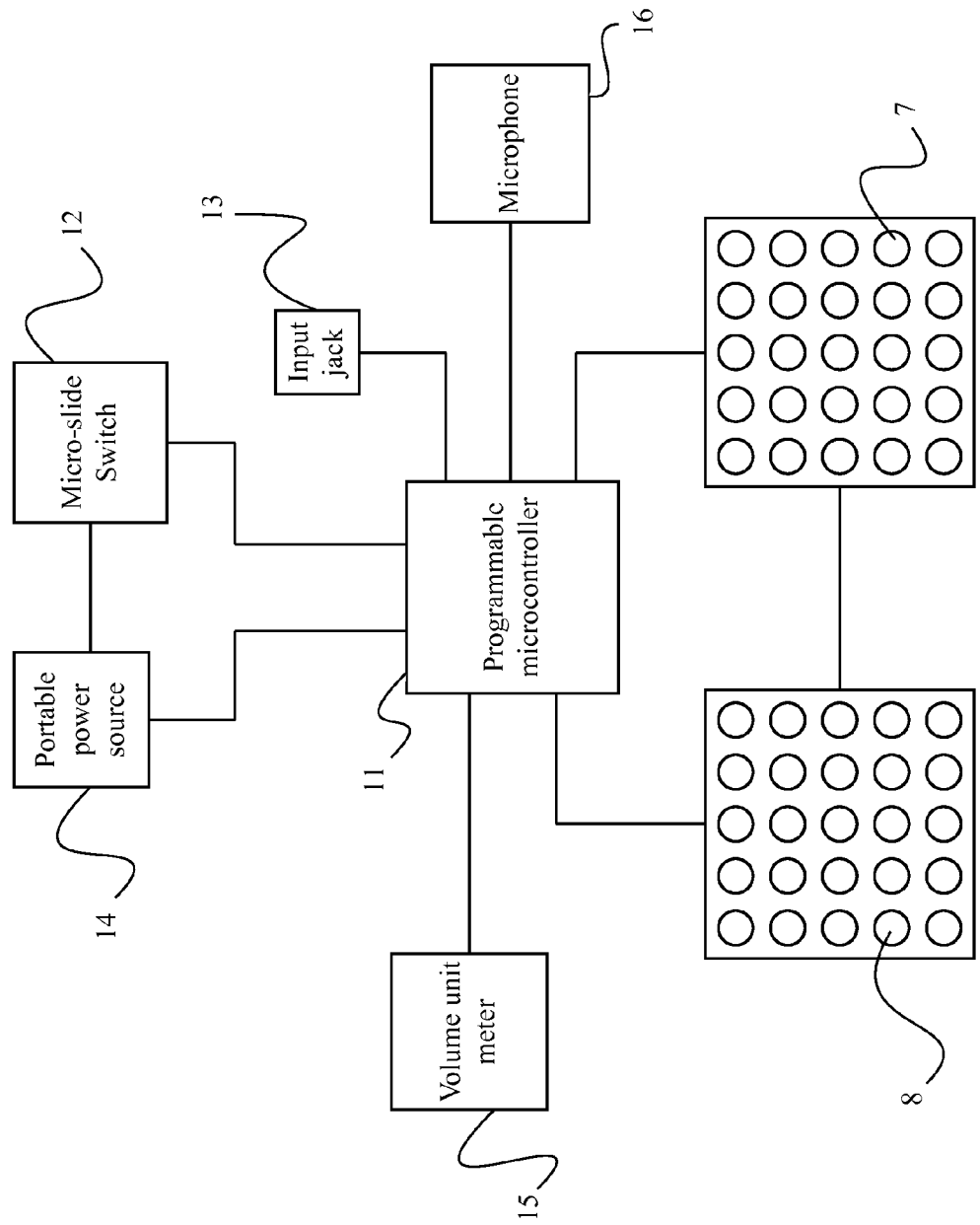
FIG. 5 is a schematic of the electronic components of the present invention.

The programmable microcontroller 11 allows the present invention to manage and control all of the electronic components of the present invention and is shown in FIG. 5. The left LED matrix 7 and the right LED matrix 8 are electronically connected to the programmable microcontroller 11, which allows the present invention control each individual LED on the left LED matrix 7 and the right LED matrix 8 by turning them on and off. The programmable microcontroller 11 can turn on or off each individual LED of the left LED matrix 7 in order to display a particular pattern or lettering across the left LED matrix 7. Similarly, the programmable microcontroller 11 can turn on or off each individual LED of the right LED matrix 8 in order to display a particular pattern or lettering across the right LED matrix 8. The left LED matrix 7 and the right LED matrix 8 are electronically connected to each other so that a particular pattern or lettering can be harmoniously displayed across both the left LED matrix 7 and the right LED matrix 8. In one embodiment of the present invention, the programmable microcontroller 11 could use a protective base to electronically connect to the other components. For example, one kind of protective base is an integrated circuit (IC) pin socket, which would allow the programmable controller to electronically connect to other components without damaging its pins.

The programmable microcontroller 11, the left LED matrix 7, the right LED matrix 8, and the other electronic components are electrically powered by the portable power source 14 such as a battery. In the preferred embodiment of the present invention, the portable power source 14 is specifically a button battery because of the size constraints of the present invention on the user's face. The portable power source 14 is electrically connected in series with the micro slide switch 12, which is used to turn the electronic components of the present invention on and off. The portable power source 14 and the micro slide switch 12 is electrically connected to the programmable microcontroller 11 so that the user can break the circuit to turn off the electronic components and can complete the circuit to turn on the electronic components. The programmable microcontroller 11 is able to distribute the electrical power from the portable power source 14 to all of the other electronic components.

The other electronic components of the present invention are the input jack 13, the volume unit (VU) meter 15, and the microphone 16. The input jack 13 is electronically connected to the programmable microcontroller 11 and allows the user to input computer executable instructions into the programmable microcontroller 11. The programmable microcontroller 11 can receive the computer executable instructions in a number of different computer languages such as "BASIC" and "C". The computer executable instructions are used to program the pattern or lettering that will be displayed by the left LED matrix 7 and/or the right LED matrix 8. The input jack 13 would also allow connectivity between the present invention and a smart-phone or different portable computing device such as a tablet personal computer or a laptop. The microphone 16 is used to pick up sound or music pulses around the present invention. For example, the microphone 16 would pick up the music playing at a rave party. The microphone 16 electronically connected to programmable controller so that the left LED matrix 7 and the right LED matrix 8 could display a pattern or a lettering that reacts to the sound or music pulses around the present invention. The VU meter 15 is used pick up the sound level around the present invention. The VU meter 15 is also electronically connected to the programmable microcontroller 11 so that the left LED matrix 7 and the right LED matrix 8 could display a pattern or a lettering that reacts to the sound level around the present invention. In addition, the present invention could include a control panel that is electronically connected to the programmable microcontroller 11, which allows the user to switch between different patterns or letterings on the left LED matrix 7 and the right LED matrix 8. The present invention also includes resistors for different purposes within the electronic connections between different components.

Figure 4:
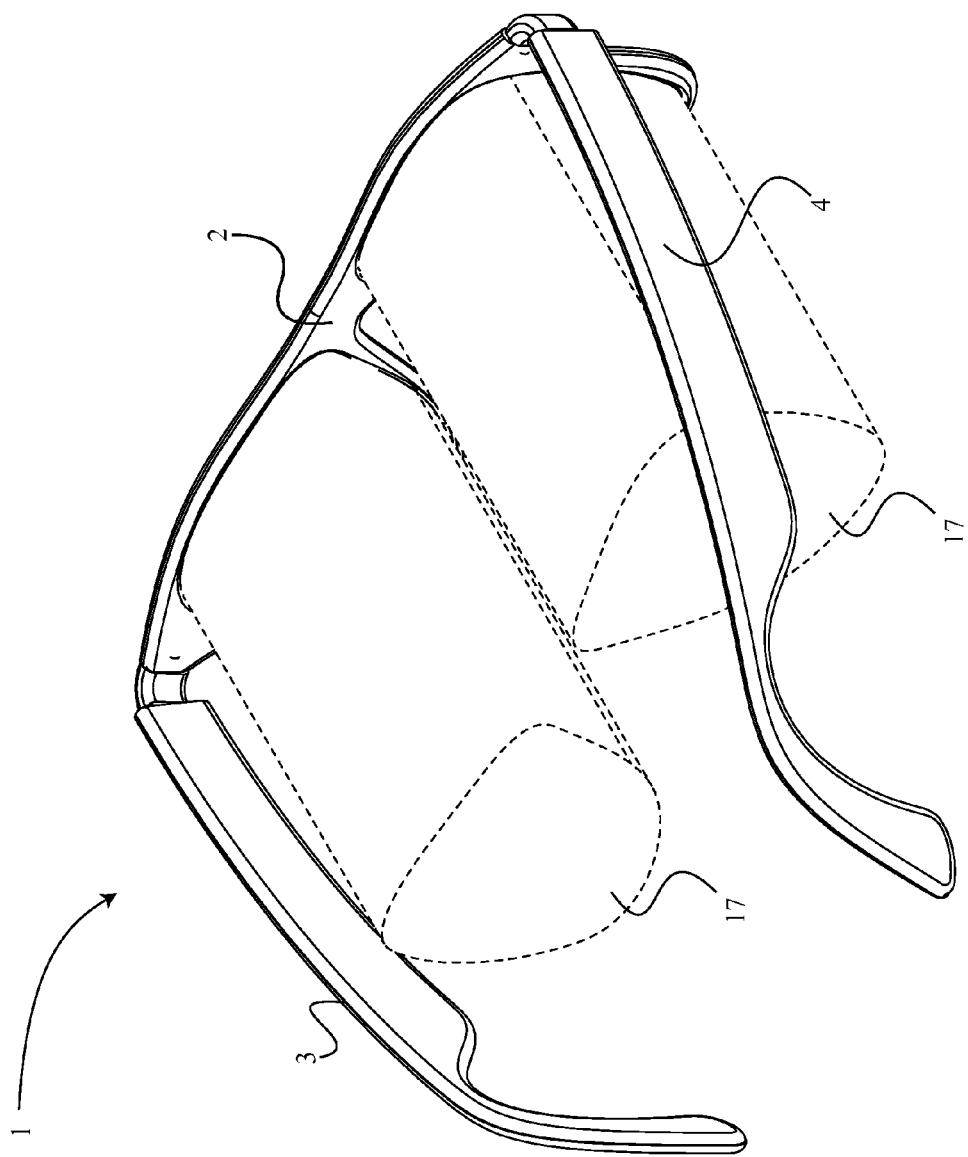
FIG. 4 is a back perspective view of the present invention highlighting the visibility diminishing volume without the electronic components.

As can be seen in FIG. 4, the present invention should be configured in such a way that only certain components are positioned within the visibility diminishing volume 17. The visibility diminishing volume 17 extends normal from the left lens 5 and the right lens 6 and is delineated by the left lens 5 and the right lens 6. The visibility diminishing volume 17 is also located in between the left temple 3 and the right temple 4 when the left temple 3 and the right temple 4 are perpendicularly positioned to the lens frame 2. For the present invention, only the left lens 5, the right lens 6, the left LED matrix 7, and the right LED matrix 8 are located in the visibility diminishing volume 17. The programmable microcontroller 11, the micro slide switch 12, the input jack 13, the portable power source 14, the VU meter 15, and the microphone 16 are positioned outside of the visibility diminishing volume 17 so that they do not diminish the user's visibility while wearing the present invention. In addition, the programmable microcontroller 11, the micro slide switch 12, the input jack 13, the portable power source 14, the VU meter 15, and the microphone 16 are attached to the eyewear body 1 in some configuration that accommodates the size constraints of the present invention, the comfortableness of the present invention on the user's face, and the aesthetics of the present invention.

Although the invention has been explained in relation to its preferred embodiment, it is to be understood that many other possible modifications and variations can be made without departing from the spirit and scope of the invention as hereinafter claimed.

What is claimed is:

1. An eyewear with a light emitting matrix comprising:
   a controller;
   an eyewear body, the eyewear body comprising a left temple, a right temple, and a lens frame defining at least one lens opening;
   a portable power source; and
   a light emitting matrix comprised of an array of independently addressable light emitting sources such that each light emitting source can be turned on and off independently, the light emitting matrix being coupled to the controller and coupled to the eyewear body and positioned within the lens opening;
   wherein the controller is programmed by a user to independently turn on or off each addressable light emitting sources to form a customized configuration of the light emitting matrix, and
   wherein the light emitting matrix is not directed towards an eye of a wearer of the eyewear.

2. The eyewear of claim 1, wherein the controller and the portable power source are mounted on the eyewear body.

3. The eyewear of claim 1, wherein the controller is capable of independently turn on and off each addressable light emitting sources to form a plurality of possible customized configurations for the light emitting matrix.

4. The eyewear of claim 3, wherein the controller is programmed to change the light emitting matrix from one configuration to any second configuration by independently turning on or off each addressable light emitting source.

5. The eyewear of claim 4, wherein
   the lens frame comprises a left lens opening and a right lens opening, the left lens opening containing a left light emitting matrix and the right lens opening containing a right light emitting matrix; and
   wherein the controller is capable of changing the configuration of the left light emitting matrix and the right light emitting matrix to give an appearance of a pattern or text across both the left light emitting matrix and the right light emitting matrix.

6. The eyewear of claim 4 further comprising:
   a volume unit (VU) meter electronically connected to the controller; and
   a microphone electronically connected to the controller;
   wherein the controller is capable of changing the configuration of the light emitting matrix in response to sound received by either the VU meter or microphone.

7. The eyewear of claim 4 further comprising an external computing device in direct communication with the controller, the external computing device configured to allow a user to program the controller to change the configuration of the light emitting matrix without the use of an intermediary storage device.

8. The eyewear of claim 7, wherein the external computing device is a smartphone, tablet device, laptop, or personal computer.

9. An eyewear comprising:
   an eyewear body;
   a portable power source;

a light emitting diode (LED) matrix comprising a left matrix and a right matrix; and
a controller coupled to the LED matrix and capable of turning on and off individual LEDs allowing for a plurality of configurations for the LED matrix; and
an external computing device in direct communication with the controller, the external computing device configured to allow a user to program the controller to turn on and off each individual LED to form a configuration of the light emitting matrix;
wherein the controller is programmed by a user to change the configuration of the LED matrix to a second configuration of the LED matrix without the use of an intermediary storage device, and
wherein the LED matrix is not directed towards an eye of a wearer of the eyewear.

10. The eyewear of claim 9, wherein the controller and the portable power source are mounted on the eyewear body.

11. The eyewear of claim 9, wherein the controller is programmed to change the LED matrix from one configuration to any second configuration by independently turning on or off each addressable LED.

12. The eyewear of claim 11 further comprising:
a volume unit (VU) meter electronically connected to the controller; and
a microphone electronically connected to the controller;
wherein the controller is capable of changing the configuration of the light emitting matrix in response to sound received by either the VU meter or microphone.

13. The eyewear of claim 12 further comprising a left lens and a right lens; wherein the left matrix is coupled to the left lens and the right matrix is coupled to the right lens.

14. The eyewear of claim 13, wherein the LEDs are properly spaced within the LED matrix to allow the user to see through the LED matrix when wearing the eyewear.

15. The eyewear of claim 12, wherein the controller is capable of changing the configuration of the left matrix and the right matrix to give an appearance of a pattern or text across both the left matrix and the right matrix.

16. The eyewear of claim 9, the eyewear body comprising a left temple, a right temple, and a lens frame defining a left lens opening and a right lens opening, the left lens opening containing the left matrix and the right lens opening containing the right matrix.

17. The eyewear of claim 9, wherein the external computing device is a smartphone, tablet device, laptop, or personal computer.

18. The eyewear of claim 9, wherein the LED matrix is a two-dimensional array of LEDs, the matrix containing at least three LEDs in each row of the matrix and at least three LEDs in each column of the matrix.

19. An eyewear with a light emitting matrix comprising:
a controller;
an eyewear body, the eyewear body comprising a left temple, a right temple, and a lens frame defining at least one lens opening;
a portable power source;
a light emitting diode (LED) matrix comprised of an array of independently addressable LEDs such that each LED can be turned on or off independently, the LED matrix being coupled to the controller and coupled to the eyewear body and positioned within the lens opening, the controller being capable of turning on or off each addressable LED to form a configuration of the LED matrix;
a volume unit (VU) meter electronically connected to the controller; and
a microphone electronically connected to the controller;
wherein the controller is capable of changing the configuration of the LED matrix in response to sound received by either the VU meter or microphone, and
wherein the LED matrix is not directed towards an eye of a wearer of the eyewear.

20. The eyewear of claim 19, wherein the VU meter and the microphone are mounted to the eyewear body.

* * * * *